United States Patent
Ghiam et al.

(10) Patent No.: US 10,195,839 B2
(45) Date of Patent: Feb. 5, 2019

(54) THERMOFORM LABELING

(71) Applicant: Avery Dennison Corporation, Pasadena, CA (US)

(72) Inventors: Farid F. Ghiam, Beachwood, OH (US); Victor P. Holbert, Newbury, OH (US); Michael Zajaczkowski, Bellefonte, PA (US); Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 347 days.

(21) Appl. No.: 13/786,563

(22) Filed: Mar. 6, 2013

(65) Prior Publication Data

US 2013/0180656 A1   Jul. 18, 2013

Related U.S. Application Data

(63) Continuation of application No. 13/821,020, filed as application No. PCT/US2011/050896 on Sep. 8, 2011.
(Continued)

(51) Int. Cl.
*B29C 43/00* (2006.01)
*B29C 43/14* (2006.01)
(Continued)

(52) U.S. Cl.
CPC ............ *B32B 38/145* (2013.01); *B29C 51/02* (2013.01); *B29C 51/16* (2013.01); *B32B 27/08* (2013.01);
(Continued)

(58) Field of Classification Search
CPC .............. B32B 2519/00; B32B 38/145; B29C 47/0021; B29C 51/04; B29C 51/02;
(Continued)

(56) References Cited

U.S. PATENT DOCUMENTS 4,059,471 A * 11/1977 Haigh .................... B29C 49/52
 101/34
4,355,721 A   10/1982 Knott et al.
(Continued)

FOREIGN PATENT DOCUMENTS

EP   0 800 915    10/1997
EP   2 189 267    5/2010
(Continued)

OTHER PUBLICATIONS

Translation of WO2009-010178.*
(Continued)

*Primary Examiner* — Sonya M Sengupta
(74) *Attorney, Agent, or Firm* — Avery Dennison Corporation

(57) ABSTRACT

Processes for forming a thermoformed labeled article are described. Labels are attached to a sheet to be thermoformed or to a section thereof. Label attachment can optionally use an adhesive. If the label material is completely or partially compatible with the sheet then the use of adhesive may not be necessary. The labels may also receive various graphics or other designs, such as by printing. After appropriate placement of the label relative to the sheet, the assembly of both sheet and label is thermoformed. After thermoforming, a finished and labeled article is produced. Also described are various labels and label assemblies which are uniquely suited for use in the processes described herein.

20 Claims, 3 Drawing Sheets

Related U.S. Application Data

(60) Provisional application No. 61/381,015, filed on Sep. 8, 2010.

(51) Int. Cl.

| | | |
|---|---|---|
| *B29C 43/18* | (2006.01) | |
| *B29C 43/28* | (2006.01) | |
| *B29C 43/30* | (2006.01) | |
| *B29C 51/02* | (2006.01) | |
| *B29C 51/16* | (2006.01) | |
| *B32B 27/08* | (2006.01) | |
| *B32B 27/10* | (2006.01) | |
| *B32B 27/12* | (2006.01) | |
| *B32B 27/30* | (2006.01) | |
| *B32B 27/32* | (2006.01) | |
| *B32B 27/34* | (2006.01) | |
| *B32B 38/00* | (2006.01) | |

(52) U.S. Cl.
CPC .............. *B32B 27/10* (2013.01); *B32B 27/12* (2013.01); *B32B 27/308* (2013.01); *B32B 27/32* (2013.01); *B32B 27/34* (2013.01); *B29C 43/00* (2013.01); *B29C 43/14* (2013.01); *B29C 43/28* (2013.01); *B29C 43/30* (2013.01); *B29C 2043/185* (2013.01); *B32B 2307/7244* (2013.01); *B32B 2307/75* (2013.01); *B32B 2519/00* (2013.01); *Y10T 156/1002* (2015.01); *Y10T 428/24736* (2015.01); *Y10T 428/28* (2015.01)

(58) Field of Classification Search
CPC .......... B29C 51/16; B29C 1/16; B29C 43/00; B29C 43/28; B29C 43/30; B29C 43/14; B29C 49/24; B29C 2049/2431; B29C 2049/2433; B29C 51/14; B29C 51/18; B29L 2031/744
USPC .............................. 156/277, 242; 264/173.15
See application file for complete search history.

(56) References Cited

U.S. PATENT DOCUMENTS

| | | | |
|---|---|---|---|
| 4,474,725 A * | 10/1984 | Sands | B29C 51/16 264/510 |
| 4,746,562 A | 5/1988 | Fant | |
| 4,800,129 A * | 1/1989 | Deak | B29C 51/002 428/474.4 |
| 5,100,963 A | 3/1992 | Lin | |
| 5,125,994 A * | 6/1992 | Harasta | B29B 13/023 156/160 |
| 5,180,635 A | 1/1993 | Plamthottam et al. | |
| 5,183,841 A | 2/1993 | Bernard | |
| 5,262,216 A | 11/1993 | Popat et al. | |
| 5,475,075 A | 12/1995 | Brant et al. | |
| 5,491,009 A | 2/1996 | Bekele | |
| 5,530,054 A | 6/1996 | Tse et al. | |
| 5,558,913 A * | 9/1996 | Sasaki | B05C 5/0254 428/202 |
| 5,593,759 A | 1/1997 | Vargas et al. | |
| 5,622,783 A | 4/1997 | Huizer et al. | |
| 6,068,933 A | 5/2000 | Shepard et al. | |
| 6,187,432 B1 | 2/2001 | Krish et al. | |
| 6,562,476 B2 | 5/2003 | Shepard et al. | |
| 6,861,127 B2 | 3/2005 | Glawe et al. | |
| 6,942,927 B2 | 9/2005 | Shepard et al. | |
| 7,935,301 B2 | 5/2011 | Hofmeister et al. | |
| 8,551,279 B2 * | 10/2013 | Johnson | B29C 43/28 156/295 |
| 9,290,031 B2 * | 3/2016 | Muller | B29C 51/02 |
| 2003/0067099 A1 | 4/2003 | Miller et al. | |
| 2008/0044617 A1 * | 2/2008 | Schmitz | B29C 51/165 428/71 |
| 2008/0280111 A1 | 11/2008 | Blackwell et al. | |
| 2009/0017297 A1 | 1/2009 | Amon et al. | |
| 2009/0179342 A1 * | 7/2009 | Araujo | B29C 45/1418 264/161 |
| 2009/0274922 A1 * | 11/2009 | Roys | B29C 45/14811 428/532 |
| 2009/0286050 A1 * | 11/2009 | Langvin et al. | 428/195.1 |
| 2010/0200596 A1 * | 8/2010 | Wallace | B32B 7/12 220/570 |
| 2010/0326590 A1 * | 12/2010 | Roth | B29C 51/16 156/212 |

FOREIGN PATENT DOCUMENTS

| | | | | |
|---|---|---|---|---|
| WO | WO-0245956 A1 * | 6/2002 | ............. | B32B 27/32 |
| WO | 2003/106143 | 12/2003 | | |
| WO | WO-2007100681 A1 * | 9/2007 | ............. | B29C 51/02 |
| WO | 2008/111000 | 9/2008 | | |
| WO | 2009/010178 | 1/2009 | | |

OTHER PUBLICATIONS

Written Opinion of WO2009-010178.*
English translation of WO2006/040057.*
Database WPI Week 200917, Thomson Scientific, XP002674840, English abstract of WO 2009/011372 published Jan. 22, 2009, Yupo Corporation.
Invitation to pay additional fees issued in corresponding International application No. PCT/US11/050896 dated May 14, 2012.
Invitation to pay additional fees issued in related International application No. PCT/US11/057088 dated May 15, 2012.
ISR and WO issued in corresponding International application No. PCT/US11/050896 dated Jul. 31, 2012.
ISR and WO issued in related International application No. PCT/US11/057088 dated Aug. 8, 2012.
Response to Written Opinion and Chapter II Demand submitted in corresponding International application No. PCT/US11/050896 dated Sep. 26, 2012.
International Preliminary Report on Patentability issued in corresponding international Application No. PCT/US11/050896 dated Jan. 11 2013.

\* cited by examiner

THERMOFORM LABELING

CROSS REFERENCES TO RELATED APPLICATIONS

The present application is a continuation of U.S. application Ser. No. 13/821,020 filed Mar. 6, 2013, which is a 371 of International Application No. PCT/US2011/050896 filed Sep. 8, 2011, which was published in English on Mar. 15, 2012. PCT/US2011/050896 claims the benefit of U.S. Provisional Application No. 61/381,015 filed Sep. 8, 2010. All of the previously listed applications are incorporated herein by reference in their entireties.

FIELD OF THE INVENTION

The present invention relates to methods for labeling a sheet and then thermoforming the labeled sheet to obtain a labeled finished article. The invention also relates to labels and combinations of labeled sheets which are thermoformed.

BACKGROUND OF THE INVENTION

A wide array of consumer goods and retail products are packaged in containers or articles that are produced by thermoforming. Such thermoformed articles are typically labeled after they are formed. To produce a thermoformed article, a polymeric sheet or film is first heated to its softening point. Once the sheet or film becomes pliable, the sheet is positioned into a mold cavity by application of vacuum to a side of the sheet while the sheet is appropriately positioned relative to the mold. Alternatively, a male member can be used to urge or otherwise position the sheet into the female mold cavity. In either technique, the heated and pliable sheet is pressed or otherwise drawn to matingly contact the mold cavity. As a result, the sheet adopts a desired configuration corresponding to that of the mold cavity. After cooling, the formed article is removed from the cavity. The article is then subsequently labeled in a separate operation either by the thermoforming manufacturer or by a third party such as a convertor or end user downstream. These conventional processes are generally satisfactory. However, requiring separate labeling operations to produce a final labeled article increases production costs, complexity, and inventory.

In-mold labeling techniques are also known in which a label is incorporated into an article during thermoforming of the article. In these methods, labels are placed or otherwise positioned in the mold cavity. Upon contact with the heated article during thermoforming, the label is then affixed to the article. In-mold labeling techniques suffer from several disadvantages and may require special molding equipment, practices, and controls to accommodate placement and retention of labels within the molding cavity.

Alternatively, another technique is known in which label markings or indicia are incorporated into a sheet or film assembly prior to thermoforming. In this technique, a pre-printed formable web is manufactured by first reverse printing one ply of a multilayer formable web and then adhesively laminating the reverse printed film to a second layer of the same (or different) material in an offline lamination process to produce a finished formable web that is provided to the thermoforming operation as a finished roll. This technique offers certain advantages, however does not remedy all of the disadvantages associated with conventional or other known thermoforming and labeling operations.

Therefore, a need remains for a strategy for readily producing a labeled finished thermoformed article. Specifically, a need exists for a method of thermoforming to produce a finished and labeled article, in which the method does not require any pre-lamination operations involving one or more layers. It would be particularly desirable to provide a method for producing a finished and labeled article in a single continuous process.

SUMMARY OF THE INVENTION

The difficulties and drawbacks associated with previously known practices are addressed in the present methods for producing a finished and labeled thermoformed article.

In one aspect, the present invention provides a method for producing a labeled article. The method comprises providing a thermoforming apparatus having a thermoform surface, and providing a label defining a first face and a second face. The method also comprises forming a visual design on at least one of the first face and the second face of the label. The method additionally comprises providing a sheet defining a first face and a second face. And, the method comprises positioning the label along one of the first and second faces of the sheet to form an article intermediate. In addition, the method comprises immediately thermoforming the article intermediate using the thermoforming apparatus, whereby the article intermediate deforms to the thermoform surface to thereby form the labeled article.

In another aspect, the invention provides a method of forming a labeled article. The method comprises providing a polymeric sheet and a polymeric label. The sheet includes a first material, and the label includes a second material. The method also comprises printing a visual design on the label. The method additionally comprises attaching the label alongside the sheet to form an article intermediate. And, the method comprises immediately thermoforming the article intermediate to thereby form the labeled article.

In yet another aspect, the invention provides a label adapted for placement on a sheet and concurrently thermoformed therewith. The label comprises at least one layer of a polymeric film which defines an underside and a layer of an adhesive disposed on the underside of the polymeric film. The various materials are selected such that the material of the polymeric film has a softening point, the material of the sheet has a softening point, and the difference between the softening point of the material of the polymeric film and the softening point of the sheet is less than 10° C.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE EMBODIMENTS

Figure 1:
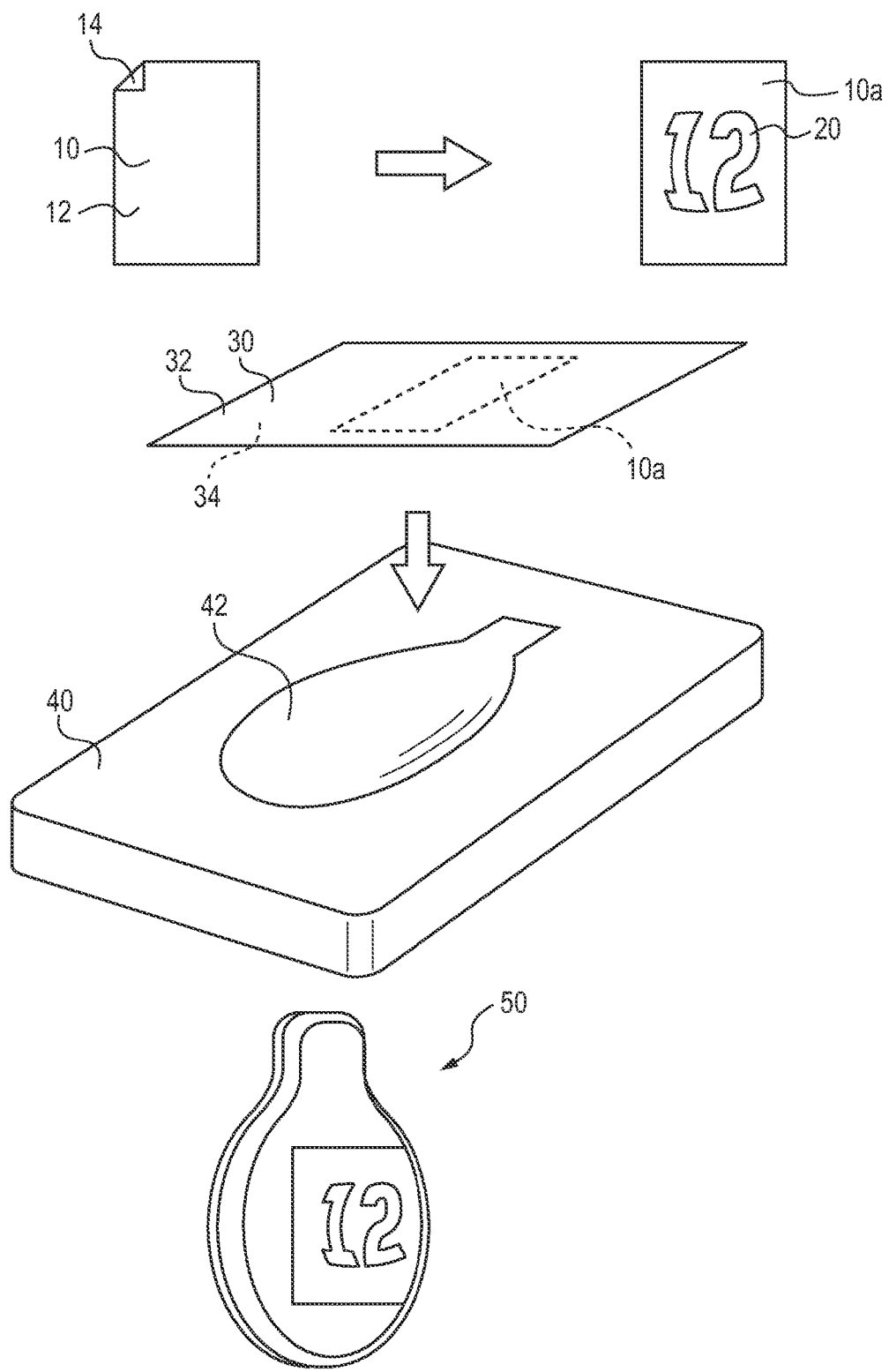
FIG. 1 is a schematic depiction of a preferred embodiment method for producing a labeled thermoformed article in accordance with the present invention.

The present invention provides various methods for producing a labeled and finished thermoformed article. The methods avoid the use of an offline pre-lamination process. In the present invention, a label is attached or positioned and retained in place in a desired area of a base sheet or film which forms the article. The label is preferably attached or positioned immediately prior to thermoforming. Most preferably, the label is printed immediately prior to thermoforming and typically, prior to attachment or positioning of the label relative to the base sheet or film. During thermoforming, the thermoforming heat softens the label and the sheet, and the label becomes pliable and stretches with the sheet while the article is being formed. Upon completion of the thermoforming operation, the finished article includes all desired labeling, thereby eliminating the need for an additional step of labeling.

In the preferred embodiments described herein, containers or decorative items of nearly any shape can be labeled in their entirety. For instance, a semi-circular thermoformed container can be labeled using the preferred embodiment methods. In contrast, it is generally not possible to label such containers in their entirety after formation by conventional thermoforming and application of a pressure sensitive label. This is because pressure sensitive labels will not uniformly wrap around a container with sharp curves or a complex geometrical shape. Many other advantages of the preferred embodiment techniques exist as compared to traditional practices involving labeling of thermoformed pieces. For example, these advantages include but are not limited to late stage differentiation for articles, inventory reduction of articles, increased flexibility for end users such as when changing from one shelf-keeping unit (SKU) to another, ease of promotional product preparation, and cost reduction.

The present invention also provides various labels and label assemblies which are particularly useful in conjunction with the methods described herein and/or in forming various labeled containers, packages, and/or substrates.

Sheet or Film of the Article

A wide array of materials can be used for the sheet(s) or film(s) that receive labels and which are then subjected to thermoforming to form the article(s) of interest. For example, polymeric films or sheets made from standard thermoformable materials and their blends such as polystyrene (PS), poly(ethylene terephthalate) (PET), poly(ethylene terephthalate glycol) (PETG), acrylic polymers, polycarbonates, polyethylene or other polyolefins, or other polymers and combinations thereof typically used in thermoforming in applications such as trays, food/vegetable packages, cups, decorative or functional items, etc. are all suitable for the preferred embodiment methods.

Additional specific examples of polymeric materials suitable for the sheet or film to be thermoformed include polypropylene and modified polypropylene. When thermoforming polypropylene, high-performance nucleating agents may be used to improve speed, physical properties and part aesthetics. And, various clarifying agents can be included in the polymeric material to provide clarity approaching that of glass and amorphous polymers. High performance nucleating agents can improve the quality of extruded polypropylene sheet feedstock. Further, clarifying agents for polypropylene enable this polymer to replace polystyrene and poly(ethylene terephthalate) in see-through articles, particularly shallow draw lids and containers and high end applications.

Homopolymer polypropylene is widely used in sheet extrusion and thermoforming applications because of its stiffness, clarity and cost effectiveness. Random copolymer polypropylene may be used to provide even higher levels of clarity and gloss and better cold temperature impact properties. Form an environmental standpoint, polypropylene's low density helps reduce the amount of material needed as well as overall packaging weight, which helps minimize landfilling and reduce fuel usage during shipping. Polypropylene also has a low carbon footprint, as a result of fewer emissions released during manufacture. Polypropylene is easily recycled in existing waste management systems, allowing the material to be reused indefinitely. In addition, polypropylene is generally free from undesirable side effects during recycling, such as crosslinking and forming a gel, or outgassing.

In addition, or instead of polymeric materials for the sheet(s) or films, the present invention includes the use of certain paper-based materials. For example, paper-based materials formed primarily from renewable resources are believed to also be suitable candidates for sheets or films to be thermoformed.

Furthermore, various composite materials can be used such as paper-based materials coated or coextruded with polymeric materials and in particular, polymer barrier materials such as polyethylene (PE) and ethylene vinyl alcohol (EVOH). Composite materials can include polymeric material(s), paper-based materials(s), metal(s) and alloy(s) which can for example be in the form of foils, and combinations thereof.

The material(s) forming the sheet(s) or film(s) can also include one or more additives. For example, various structural additives could be included such as fibrous high tensile strength materials. Agents providing certain barrier properties such as oxygen or water permeability can be included. Density adjusting agents, coloring agents, environmental protective agents such as for UV protection, and other agents for imparting particular properties or characteristics to the article can be used in the material of the sheet or film.

The sheet or film which forms the article(s) of interest can be of a single or monolayer, or can comprise multiple layers. For multilayer assemblies, the layers may be formed from different materials or from the same materials. In addition, it is contemplated that a variety of coatings and/or functional additives can be included in the sheet or film which forms the article(s) of interest. It is also contemplated that a wide array of packaging provisions could be included such as layer assemblies that provide resealing or closure function, tamper indicators, and the like.

Any material selected for use as the sheet or film to be thermoformed preferably exhibits a softening point that is suitable for the end use application and for the thermoforming equipment to be used in forming the finished and labeled articles. The term "softening point" as used herein refers to the temperature at which a material becomes sufficiently pliable so that the material can be thermoformed, however does not excessively flow or deform. For many materials, their softening point may be within a range of temperatures. For end use applications at ambient temperatures, it is generally preferred that the softening point of the material forming the sheet or film is greater than about 60° C. However, the present invention includes the use of materials having softening points less than 60° C. The term "softening point" also includes the glass transition temperature (Tg) if a material is used which is more accurately described by its Tg.

Another preferred characteristic of the material selected for use in the sheet or film to be thermoformed is that the material not tear, rip, or fracture during thermoforming. This characteristic also depends upon the particular thermoforming process and configuration of the thermoforming mold and surface. It will be appreciated by those skilled in the art of thermoforming that in many if not most thermoforming operations, the material is stretched, drawn, and/or expanded in one or more directions. This occurs as a result of the material deforming as it adopts the contour and/or configuration of the thermoforming surface.

Label and Other Aspects

The label material used in the preferred embodiment methods has characteristics such that the label material stretches or expands with the sheet or film during the thermoforming process without tearing. The label material therefore can be made from the same material as that of the sheet or film being thermoformed to ensure their compatibility during the thermoforming process. However, the label material and the base sheet do not necessarily need to be made from the same material. It is the ability of the label to stretch or otherwise deform at the thermoforming temperature which is important for formation of a labeled thermoformed piece. That is, at the thermoforming temperature, the stretching characteristics of the label and the base sheet are compatible with one another and preferably at least equal or substantially so. A label and a sheet are deemed to be compatible with one another if at the temperature at which thermoforming occurs, neither the label nor the sheet tears or fractures during the particular thermoforming operation. For example, a PETG film can be used as the label film material for a finished article made from PETG. At the thermoforming temperature, if the label does not stretch to the same magnitude and/or at the same rate as that of the base sheet, the label could potentially tear during the process. On the other hand, at the thermoforming temperature, if the label is capable of higher stretch magnitudes than the base sheet desirable results may be obtained. For instance, a PETG label material could be used in applications where the base sheet/film polymer is PET since a PETG label would exhibit compatible stretch characteristics at the PET forming temperature. On the other hand, a PET label film is generally not desirable for labeling a thermoformed container made from PETG as the label film will not stretch sufficiently at PETG forming temperatures. Similarly, a PET label film material will not be suitable in applications were the forming sheet material is made from low density polyethylene (LDPE). The reverse of this latter example is also not feasible as the LDPE label could melt at PET thermoforming temperatures. Thus, the materials of the label and the sheet to be thermoformed must exhibit compatible stretch characteristics and preferably exhibit equivalent stretch characteristics at the temperature at which thermoforming occurs.

In addition to the stretch magnitudes, softening and melting points of the label and the base sheet must be considered and chosen properly. As will be appreciated, the materials of the label and sheet are preferably selected such that neither material undergoes excessive melting at any point in the process. Thus, it is preferred that the melting points of the materials of the label and sheet are significantly greater than the temperature at which thermoforming occurs. It is also preferred that the softening points of the label and the sheet are similar to one another. In certain embodiments, it is preferred that the difference in softening points of the label and of the sheet to be thermoformed is less than 10° C., and more preferably less than 5° C. When comparing softening point temperature ranges to one another, the difference is determined by using the upper or lower temperatures that are closest to one another. The closer the softening points of the label and sheet are to one another, and more similar the stretching characteristics of the label and sheet are to one another at the thermoforming temperature, the better the labeling quality and uniformity in the finished article.

In another aspect of the invention, the label material can be selected, formed, and/or have particular characteristics so as to impart desired functionalities to the finished article. That is, a "functional label" can be used to impart its functionality to the finished article. For example, the label could be partially drawn during an initial extrusion process. Once such label is drawn further during the thermoforming process, the barrier properties of the finished article could be improved. A label formed from a barrier film could impart such characteristic(s) to the finished article. Another example of a functional label is the use of colorant or UV resistant additives in the label to impart the same to the finished article. In addition to imparting additional container functionality, such a labeling technique could result in an overall cost reduction as the quantity of a specific additive or colorant needed for the film would be much less than the same required for the base sheet if instead, the base sheet were to be thermoformed and labeled with a pressure sensitive label. Additional non-limiting examples of functional agents that can be incorporated into a label or label assembly for subsequent affixment to layer(s) prior to thermoforming include fragrance agents, light enhancement agents, gloss promoting or gloss reduction agents, and other aesthetic or appearance promoting agents.

As previously described for the sheets or films, the label can be a single layer or comprise multiple layers. For multilayer label assemblies, the layers may be formed from different materials or from the same materials. The label can include one or more functional agents as noted, or be free of such agents.

Figure 5:
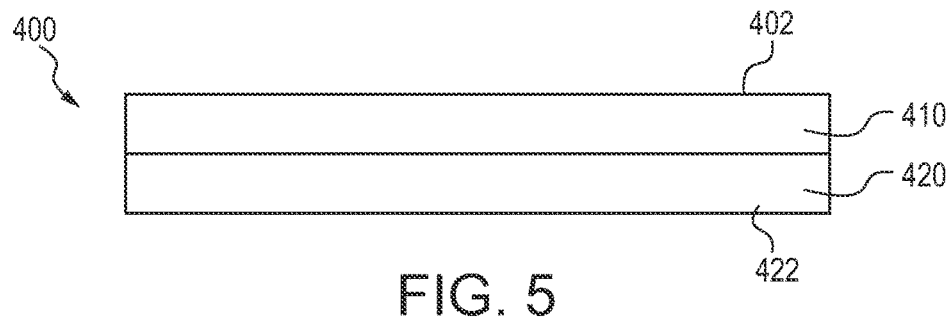
FIG. 5 is a schematic cross sectional view of a preferred embodiment label assembly according to the present invention.

In accordance with the invention, various preferred embodiment labels and label assemblies are provided. In certain embodiments, a label assembly generally comprises one or more polymeric layers or films and one or more adhesive layers for adhesively securing the polymeric layer(s) to another sheet or film of interest as described herein. The polymeric layers or films comprise one or more polyolefin layers and/or one or more polyamide layers. FIG. 5 illustrates a schematic cross sectional view of a preferred embodiment label 400 comprising a polymeric film layer 410 and an adhesive layer 420. The polymeric film layer 410 defines an outer surface 402. And the adhesive layer 420 defines an oppositely directed inner face or underside 422. A wide array of polymers can be used for the film layer 410. Preferably, the film layer 410 comprises at least one polyolefin and/or polyamide.

Figure 6:
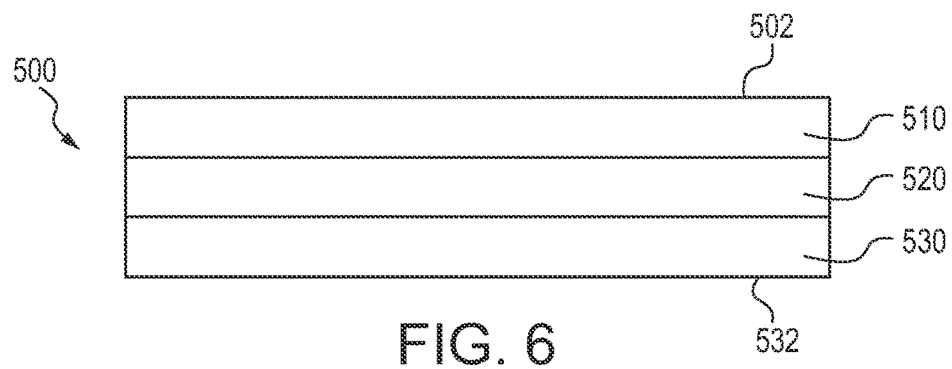
FIG. 6 is a schematic cross sectional view of another preferred embodiment label assembly according to the present invention.

FIG. 6 is a schematic cross sectional view of another preferred embodiment label assembly 500 comprising a first film layer 510 defining an outer face 502, a second film layer 520, and an adhesive layer 530 defining an underside 532. The first film layer 510 can comprise one or more of a polyolefin and/or a polyamide. The second film layer 520 can also comprise one or more of a polyolefin and/or a polyamide. The second layer may also include one or more tie components as described in greater detail.

The polyolefins used in the preferred embodiment label assemblies can include a wide array of polyolefins known in the art. The polyolefin may be a homopolymer or a copolymer. The olefins which may be used to prepare the polyolefins include those having from about two to about ten, or from two to about eight, or from about two to about four carbon atoms. Examples of useful olefins include ethylene, propylene, butylene, methyl-pentene, hexene, octene, etc. In a preferred embodiment, the polyolefin is a homopolymer or copolymer derived of ethylene, propylene or butylene. In one embodiment, the polyolefin is an ethylene homopolymer or an ethylene copolymer. The copolymer is prepared from ethylene, propylene, or butylene and an olefin having from about 3 to about 100 or from about 4 to about 30 carbon atoms. In one embodiment, the olefin has from about three to about twelve, or from about four to about ten carbon atoms. In another embodiment, the olefin has from about 10 to about 100, or from about 12 to about 30 carbon atoms. In one embodiment, the olefin used to prepare the copolymer is an alpha-olefin. Examples of useful olefins include propylene, butylene, pentene, 4-methyl-1-pentene, hexene, heptene, octene, nonene, decene, undecene, dodecene, tetradecene, hexadecene, octadecene, and docosene. Typically, the olefin is present in an amount from about 1% up to about 50%, or from about 5% to about 30%, or from about 7% up to about 25% by mole. Examples of copolymers of ethylene include ethylene/propylene copolymers, ethylene/butylene copolymers, ethylene/hexene copolymers, ethylene/octene copolymers and ethylene/dodecene copolymers of ethylene and olefins, such as alpha-olefins are disclosed in U.S. Pat. No. 5,475,075, issued to Brant et al, and U.S. Pat. No. 5,530,054, issued to Tse et al. These patents are incorporated by reference for their disclosure of ethylene olefins and processes for making the same. Preferably, the polyolefin is polyethylene.

The polyamides used in the preferred embodiment label assemblies can include a range of polyamides. For example, useful polyamide resins include those commercially available from, for example, Union Camp of Wayne, N.J. under the UNI-REZ product line, and dimer-based polyamide resins available from Bostik, Emery, Fuller, Henkel (under the VERSAMID product line). Other suitable polyamides include those produced by condensing dimerized vegetable acids with hexamethylene diamine. It is also contemplated to utilize one or more aliphatic nylons such as nylon-MXD6 which is a generic name for a range of polyamides produced from xylenediamine (MXDA).

It is also contemplated that the preferred embodiment label assembly 500 can include one or more tie layers (not shown) disposed between the first and second film layers 510 and 520, and/or disposed on either of both faces of the second film layer 520. Depending on the particular polymeric materials used to form the coextruded face stock, in some embodiments, it is advantageous to extrude, simultaneously, one or more charges of material which become "tie" layers between coextruded layers. In particular, where two layers of material would not otherwise sufficiently adhere or bond to each other when coextruded, a "tie" layer is coextruded with and between the two layers, to hold them together in a substantially permanent unitary state. For example, nylon 6 and polyethylene can be coextruded to form a substantially permanent, unitary coextrudate by simultaneously extruding nylon 6, polyethylene, and a polymer having good affinity for both materials, such as a modified polyethylene or an ethylene vinyl acetate copolymer. Such a polymer becomes a "tie" layer between the nylon 6 and polyethylene layers. In general, the choice of "tie" layer material depends, at least in part, on various properties of the materials to be joined, or "tied," together, including, for example, the materials' polar vs. nonpolar nature, modulus, flow properties, etc.

A silicone release layer and corresponding liner can be provided on the exposed underside of the adhesive layer in label assemblies 400 and 500.

It is also contemplated that any of the preferred embodiment label assemblies may comprise one or more oxygen barriers or other films. A preferred example of an oxygen barrier used in film assemblies is a layer including ethylene vinyl alcohol (EVOH). Instead of or in addition to an oxygen barrier, the preferred film assemblies may also comprise one or more barriers for reducing or preventing passage or migration or other agents or chemical species. For example, in certain applications, it may be desired to include one or more layers that reduce or prevent the migration of water vapor or moisture. Furthermore, the preferred embodiment labels and label assemblies include barrier layers against oxygen, carbon dioxide, aromas/odors, moisture, oils, chemicals, and/or any combination thereof. Representative barrier materials include, but are not limited to, nylon (all types), nylon-MXD6, EVOH, PVOH, G-polymer, acrylonitrile methyl acrylate (ANMA) such as commercially available under the designation BAREX, cyclic olefin copolymers (COC), cyclic olefin polymers (COP), polyepichlorohydrin (ECO) polymers, liquid crystal polymers (LCP), polyglycolic acid polymers (PGA) such as those available commercially under the designation KUREDUX from Kureha Corporation, and poly (methyl methacrylate) (PMMA). A wide range of barrier coating technologies are also commercially available such as those under the designation NANOLOK from Inmat Inc.; NANOSEAL from Nanopack Inc.; and GOSHENOL from Nippon Gosher which are all PVOH-based materials. In addition, SiOX materials from Ceramis, which is a silicon dioxide layer applied by liquid-vapor deposition can be used. In addition, whey-based coatings such as those available from Wheylayer could also possibly be used. Barrier coatings formed by vacuum metallization can also be included in the preferred embodiments.

Figure 7:
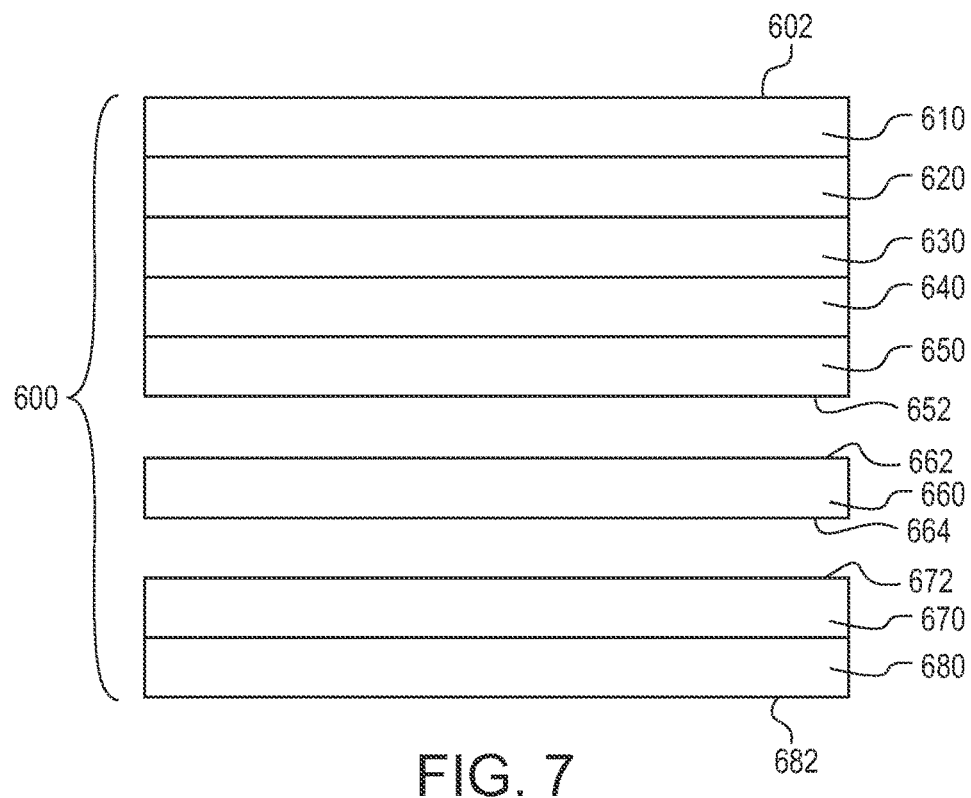
FIG. 7 is a schematic cross sectional view of another preferred embodiment label assembly according to the present invention.

FIG. 7 is a schematic cross sectional view of a preferred embodiment label assembly 600 comprising a first film layer 610 defining an outer surface 602, a first tie layer 620, an oxygen barrier layer 630, a second tie layer 640, and a second film layer 650 defining an underside 652. The label assembly 600 also comprises an adhesive layer 660 defining a first outer face 662 and an oppositely directed second outer face 664. The label assembly 600 preferably further comprises a silicone release layer 670 defining a release face 672, and a release liner 680 in contact with the release layer 670 and having an exposed underside 682.

The preferred embodiment label assemblies include several particularly preferred labels as follows. In one construction, the first film layer 610 includes a polyolefin and most preferably polyethylene and the second film layer 650 includes a polyamide. The oxygen barrier layer 63 preferably includes ethylene vinyl alcohol. The adhesive layer 660 is preferably a UV hotmelt acrylic based adhesive. The release liner 680 can be provided in a wide range of materials such as for example paper or polyester and preferably polyethylene terephthalate (PET).

In another preferred construction, instead of a UV hotmelt acrylic based adhesive for adhesive layer 660, an emulsion acrylic based adhesive is used.

In still another construction, the first film layer 610 is a polyamide and the second film layer 650 is a polyolefin such as polyethylene. The adhesive layer 660 used in this construction is preferably a UV hotmelt acrylic based adhesive.

In yet another construction, the first film layer 610 is a polyamide and the second film layer 650 is a polyolefin such as polyethylene. The adhesive layer 660 is an emulsion acrylic based adhesive.

As previously noted, the preferred embodiment labels and label assemblies may optionally include one or more barrier layers and preferably one or more oxygen barrier layers.

The oxygen ($O_2$) barrier coating materials are typically water soluble, and may include for example, PVOH-based co- or terpolymers, ethylene vinyl alcohol based copolymers (such as SOARNOL by Nippon Gohsei), and/or materials that contain hydrophilic functional groups such as —OH, —NH, amide, as well as zwitterionic moiety, etc. The oxygen barrier coating is typically coated onto a clear film, although in alternative embodiments the film may be translucent or opaque. Another preferred material in certain embodiments is polyglycolic acid. Moreover, in still additional embodiments, it may be preferred to include acrylonitrile methyl acrylate (ANMA), such as those commercially available under the designation BAREX from Ineos Barex, a division of Ineos USA, LLC.

Barrier properties for moisture or oxygen may be enhanced further by adding an additional layer. The coating materials may be, for example, either water based or solvent based. Some preferred coating materials include PVDC latex coating or PVAc latex coating.

Moreover, the invention includes the use of one or more agents and/or barrier layers for reducing transmission and/or providing protection from ultraviolet (UV) light. As is known, exposure to UV light may detrimentally impact the taste or other properties of a food or beverage. Furthermore, exposure to UV light may also impact the efficacy of numerous vitamins, drugs, and the like. Thus, one or more UV blocking agents and/or absorbers that can be incorporated in any of the layers, materials, and/or components described herein are as follows. Among families of UV absorbers which may be used where appropriate are benzophenones, salicyclates, benzotriazoles, hindered amines and alkoxy (e.g., methoxy) cinnamates. Recitation of these classes is not meant to be a limitation on other classes of UV absorbers which may be used. Among the benzotriazole UV absorbers which may be used are 2-(2-hydroxy-5-methylphenyl) benzotriazole which is available as TINUVIN P from Ciba-Geigy Corp. of Tarrytown, N.Y. Water soluble UV absorbers particularly useful include, but are not limited to: phenyl benzimidazole sulfonic acid (sold as NEO HELIOPAN, Type Hydro by Haarmann and Reimer Corp.), 2-hydroxy-4-methoxybenzophenone-5-sulfonic acid (sold as SYNTASE 230 by Rhone-Poulenc and UVINUL MS-40 by BASF Corp.), sodium 2,2-dihydroxy-4,4'-dimethoxy-5-sulfobenzophenone (sold as UVINUL DS-49 by BASF Corp.), and PEG-25 paraaminobenzoic acid (sold as UVINUL P-25 by BASF Corp.). Other UV absorbers which may be used are defined in McCutcheon's Volume 2, Functional Materials, North American Edition, published by the Manufacturing Confectioner Publishing Company (1997), which is hereby incorporated by reference. UV absorber if used, may be present in each of the label and optionally the package and/or sheet at from about 0.001% to about 3 wt. %, preferably, if present, between 0.001 and 0.05 wt. %, although in certain cases preferred ranges may be from 0.05% to 1 wt. %.

It is also contemplated that in certain applications, it may be possible to include one or more paper or paper-based materials in the label assembly. Such paper or paper-based materials may include additional amounts of other materials such as polymeric resins, inorganic additives, and other agents to tailor their resulting characteristics.

Optional Adhesives

In certain embodiments, the label is preferably attached to the thermoformable sheet by use of an adhesive that can withstand the thermoforming conditions and retain its adhesive properties at the thermoforming temperatures and draw magnitudes. Non-limiting examples of such adhesives include solvent based adhesives, and UV and/or thermally curable epoxy and/or acrylic or rubber adhesives which are designed to endure these harsh processing conditions. For a successful operation, in addition to the adhesive properties at high temperatures, viscosity of the adhesive is preferably chosen such that the adhesive will not become fluid at the thermoforming temperature and flow out from the label and sheet interface.

Use of an adhesive, however, may not be required in certain preferred methods of thermoform labeling. For instance, if the label and the forming film/sheet are fully miscible or compatible with one another such as a PETG label and a PETG base sheet, and if the label is maintained in a suitable position by mechanical means or air flow, etc.; the label could soften and adhere to the sheet at elevated thermoforming temperatures without the aid of an adhesive. In this manner, partial miscibility of the label film and the base sheet may also suffice. An example is the use of a label that contains styrene ethylene butylene styrene (SEBS) copolymer in its surface structure when such label is used in conjunction with a polystyrene base sheet. Even if such a label could not be kept in place on the sheet by any other means but by use of an adhesive, its partial miscibility with the base sheet increases adhesion and hence allows reduction of the amount of adhesive otherwise needed for labeling, thereby resulting in a substantial cost reduction. Inclusion of adhesive polymers in the label skin side which will be attached to the article using polymers such as ethylene vinyl acetate (EVA), ethylene butyl acrylate (EBA), or others could also allow adhesion of the label to the base sheet without the use of an adhesive depending on the chemistry of the base sheet. Additional examples of suitable adhesive polymers which could be included in the label skin side for subsequent contact with the sheet forming the article of interest are certain ethylene vinyl acetate, polyethylene, polypropylene, acid copolymers, and ethylene/acrylate copolymers commercially available from DuPont under the designation BYNEL®. These polymers are functionalized with reactive monomers, such as acid groups or anhydride groups. Additional examples of adhesive polymers that can be used in the preferred embodiments include, but are not limited to materials commercially available under the designations KRATON from Kraton Polymers, SEPTON from Kuraray Co., VECTOR from Dexco Polymers, and ADMER from Mitsui.

Printing

The preferred embodiment label can be printed with an ink prior to its application or attachment to the thermoforming sheet. The ink, similar to the adhesive, preferably exhibits appropriate characteristics such that the ink can withstand high thermoforming temperature(s) and the required draw magnitudes. If the ink cannot stretch with the label, the ink will potentially crack or fracture, and will have an unacceptable appearance. After stretching, the ink should not excessively lose its opacity as the quality of the printed material may not be acceptable. For example, inks formulated with polyurethanes or similar elastic polymers in their compositions are suitable materials for such an application. The incorporation of polyurethane in the ink composition generally allows stretching of the ink. The amount or percentage of polyurethane or other similar elastic polymer component in the ink formulation can most likely be correlated to the amount of stretch that the thermoformed article endures. Non-limiting examples of preferred inks include LIOVALUE and AQUALIONA inks from Toyo Ink Company of Japan. These inks have been developed for packaging applications where the printed (and laminated) package containing food is sterilized at elevated temperatures of from about 121° C. (250° F.) to about 135° C. (275° F.). Similar inks that are designed for package boiling applications may also be suitable. In many applications, it is preferred to utilize solvent inks designed for thermoforming. A preferred new low viscosity oligomer designated as CN2285 from Sartomer Company, may in certain applications be used in a UV flexo ink. This new oligomer can be used in applications in which high deformation occurs. The amount of pigment in the ink formulation and the required stretch magnitude of the label during thermoforming are factors affecting print quality and opacity. Metallic inks containing polyurethane may also prove advantageous in providing prints with high gloss enabling application on contoured shape thermoformed containers. Other materials and ink formulations known by those skilled in the art to meet such requirements may also be utilized.

The labels are typically formed to exhibit graphics. Graphics can include for example, designs, indicia, markings, text, or patterns. The graphics can be incorporated in or upon the label in nearly any fashion. As described in greater detail herein, the graphics are preferably formed by printing one or more inks on the label.

The graphics of the printed label typically distort during the stretching stage of the thermoforming process. This distortion will therefore need to be accounted for when designing and constructing a printing cylinder or plate in anticipation of printing. Preferably, a distortion printing process that compensates for the expansion that the label will undergo during the thermoforming process is used. In one approach, the stretch magnitude at various locations of a thermoformed piece is first determined. A grid patterned printed label facilitates distortion measurements at various locations on the formed piece, similar to a method described by Marcinkowski, Stanley, Michael, et al. in International Publication WO 2008/111000 A1. The distortion profile along with an accurate measure of thickness variation at various part locations are parameters typically used for print cylinder or plate design in order to print the graphics "distortedly". Upon stretching of the printed label during thermoforming, the graphics of the finished article will then appear normal. Because stretch magnitudes differ from one application or object to another, each label may need its own "distortion" printing depending upon its material, location on the finished article, and thermoforming operation.

Printing on the label can be performed in nearly any manner. Although conventional printing techniques such as offset, flexographic, and gravure printing can be used, it is generally preferred to use digital printing processes for forming the desired markings, indicia, text, patterns, and/or designs on the label especially if the inks used in digital printing have the desired stretch characteristics. These are collectively referred to herein as "visual designs." Digital printing is performed by an electronic controller or processer that stores information as to the subject matter to be printed, and one or more printheads or other components that form the desired markings, indicia, text, patterns, and/or designs, i.e. the visual designs. As previously noted, if desired, the visual designs may be initially formed or deposited in a distorted fashion. After thermoforming, such distorted visual designs appear in their intended manner.

Methods

FIG. 1 is a schematic illustration of a preferred embodiment process for forming a labeled thermoformed article 50 in accordance with the present invention. Specifically, a label sheet or film 10 is provided defining a first face 12 and an oppositely directed second face 14. The label sheet 10 preferably includes one or more polymeric film materials and preferably, as described herein. One or more markings, indicia such as text 20, and/or designs are printed or otherwise formed on one or both faces 12, 14 to form a printed label 10a. The text or indicia may be formed "distortedly" as schematically shown in FIG. 1. The label 10a is then attached or otherwise positioned relative to a polymeric sheet or film 30 which is thermoformed to form article 50. The sheet 30 defines a first face 32 and an oppositely directed second face 34. As previously described herein, the label 10 can be adhered, affixed, or otherwise secured to the sheet 30, in nearly any fashion. Preferably, a layer of adhesive is used. However, the invention includes merely positioning the label 10a relative to the sheet 30 and contacting the two components. Exposure to heat, such as from the thermoforming operation, can be used to render the interface between the label 10a and the sheet 30, sufficiently tacky to thereby retain the components in a desired position relative to one another. The label 10a may be positioned alongside either face 32 or 34 of the sheet 30. In many applications, it is preferred to locate the label 10a along a face of the sheet 30 that will form or constitute an outer face of the article that is eventually formed. For example, referring to FIG. 1, the face of the sheet 30 that will eventually form the outer face of article 50, is face 34. And so, the label 10a is positioned alongside the face 34 of the sheet 30. However, it will be appreciated that the present invention includes other arrangements and configurations.

The sheet 30 and the label 10a are then preferably subjected to a thermoforming operation involving one or more molding or forming cavities as known in the art. For example, a mold 40 defining a recessed cavity and a thermoforming surface 42 can be used. The thermoform surface, e.g. surface 42, is the surface that contacts the material to be thermoformed. As will be appreciated, the thermoform surface has a contour and/or configuration such that upon intimate contact with the material to be thermoformed, the contour and/or configuration of the thermoform surface is transferred to the material undergoing thermoforming. Upon thermoforming, a labeled article 50 for example is produced. Thermoforming technology is well known in the art. Details as to thermoforming polymeric blanks, sheets, and films are readily available in the art.

The present invention includes numerous alternative versions of the process schematically depicted in FIG. 1. That is, in no way is the invention limited to the specific process illustrated in FIG. 1. For example, although the preferred embodiment process schematically shown in FIG. 1 depicts the face 34 of the sheet carrying the label 10a, it will be understood that the label 10a could be positioned alongside the face 32 of the sheet 30. Similarly, the collection of the sheet 30 and the label 10a can be positioned relative to the thermoform surface 42 such that the label 10*a* contacts the surface 42, or so that a corresponding side of the sheet 30, opposite the side along which the label 10*a* resides, contacts the thermoform surface 42.

Figure 2:
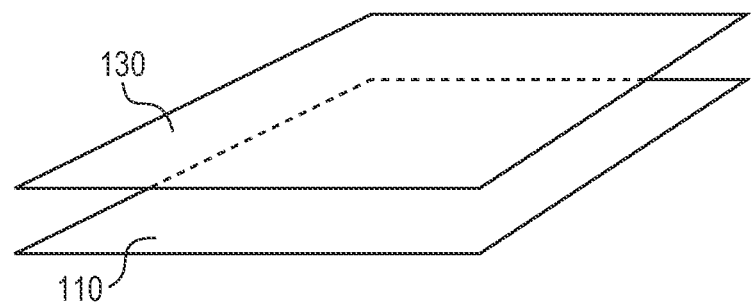
FIG. 2 is a schematic illustration of a preferred labeling configuration in accordance with the present invention.
Figure 3:
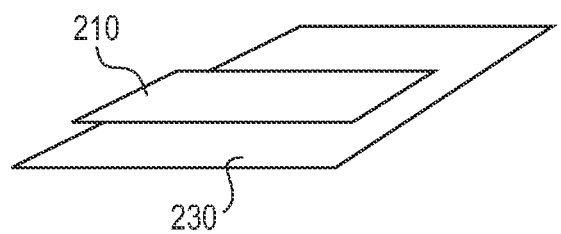
FIG. 3 is a schematic illustration of another preferred labeling configuration in accordance with the present invention.
Figure 4:
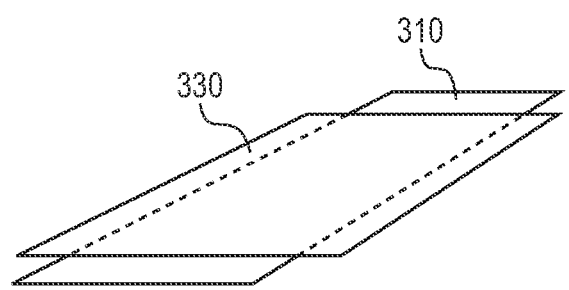
FIG. 4 is a schematic illustration of yet another preferred labeling configuration in accordance with the present invention.

The present invention and its various techniques can be used in a multitude of labeling strategies. For example, labels can be incorporated in an article in which only a portion of the article or article face is covered by the label. An example of this is depicted in FIG. 1. In other embodiments, one or more labels can be incorporated in an article in which the entirety or substantially so, of the article or article face is covered by the label. An example of this is shown in FIG. 2. FIG. 2 illustrates a label 110 having an area approximately the same or greater than that of a thermoformable sheet 130 positioned alongside one another prior to thermoforming. In still other embodiments, one or more labels can be incorporated along the entirety of an article face in a single span, such as across the entire width or height of the article or article face, as depicted in FIGS. 3 and 4. FIG. 3 depicts a label 210 positioned along a thermoformable sheet 230 prior to thermoforming. The label 210 extends across the width of the sheet 230. FIG. 4 shows a label 310 positioned along a thermoformable sheet 330 prior to thermoforming. The label 310 extends across the length of the sheet 330. Use of the various labeling practices provides great flexibility in packaging and container designs.

In many of the preferred embodiment processes of the invention, it is particularly preferred that the label is printed and attached or otherwise positioned along a face of the sheet to be thermoformed, immediately prior to thermoforming. This practice avoids having to store and maintain inventory of multiple pre-printed labels which must then be selected, accessed, and integrated into a thermoforming process. This practice of thermoforming directly after printing and applying a label in-situ and as part of a thermoforming process to form an article of interest, is referred to herein as "immediately thermoforming." That is, thermoforming is performed immediately after either printing or applying a label to a sheet to be thermoformed. Thus, the invention includes processes in which a label is printed and then applied (or positioned) to the sheet immediately followed by thermoforming. And, the invention includes processes in which a label is attached to a sheet to be thermoformed, one or more printing operations are then performed to form indicia, text, and/or designs on the label and sheet assembly, and then the printed assembly is immediately thermoformed to produce an article of interest.

The preferred embodiment methods of the invention should enable significant reductions in floor space otherwise required for container packaging and forming operations. Furthermore, the preferred embodiment methods are environmentally friendly and should result in less waste in materials and improve overall process efficiency. In addition, the preferred embodiment processes can be readily implemented in just-in-time (JIT) practices.

Although the present invention and its various preferred embodiments have been described primarily with reference to a single label and/or a single sheet, it will be appreciated that the invention includes forming multiple labeled articles on a single sheet. Thus, the invention includes operations in which multiple products or objects are formed by thermoforming a single labeled sheet. A single sheet can receive multiple labels, one or more labels being positioned at a region of the sheet identified for forming one or more products of interest. The partially or completely labeled sheet is then subjected to one or more thermoforming operations whereby a plurality of products or objects of interest are formed.

Applications for the present technology include but are not limited to a transparent food packaging such as for example products such as snack chips and coffee; pharmaceutical packaging such as for example tablets, capsules and gel-caps which can gain longer shelf life and extended protection from water and oxygen; and health and beauty packaging such as for example products such as toothpaste and lotions.

Although it is believed that the present invention will find utility in numerous industries and applications, producing and labeling of food packaging is a prime area for use of the invention.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previously known practices. However, it will be appreciated that various changes in the details, materials and arrangements of components and/or operations, which have been herein described and illustrated in order to explain the nature of the invention, may be made by those skilled in the art without departing from the principle and scope of the invention, as expressed in the appended claims.

What is claimed is:

1. A method for producing a labeled article, the method comprising:
   providing a thermoforming apparatus having a thermoform surface;
   providing a label defining a first face and a second face;
   forming a visual design on at least one of the first face and the second face of the label;
   providing a sheet defining a first face and a second face;
   positioning the label along one of the first and second faces of the sheet;
   attaching the label to the sheet by an adhesive; and
   immediately thermoforming the sheet after the label is attached thereon using the thermoforming apparatus, whereby the sheet and label deform to the thermoform surface to thereby form the labeled article wherein the label is applied in-situ and is part of a thermoforming process;
   wherein the sheet is permanently deformed to a desired article shape during the thermoforming.

2. The method of claim 1, wherein forming a visual design on the label is performed by printing an ink on the label to form the visual design by digital printing.

3. The method of claim 1, wherein forming a visual design on the label is performed by printing an ink on the label to form a visual design by a technique selected from the group consisting of offset printing, flexographic printing, and gravure printing.

4. The method of claim 2, wherein the printed ink design is distorted prior to thermoforming.

5. The method of claim 3, wherein the printed ink design is distorted prior to thermoforming.

6. The method of claim 4, wherein the printed ink design is free of distortion after thermoforming.

7. The method of claim 5, wherein the printed ink design is free of distortion after thermoforming.

8. The method of claim 1, wherein the label exhibits a first softening point and the sheet exhibits a second softening point, the difference between the first softening point and the second softening point is less than 10° C.

9. The method of claim 8, wherein the difference between the first softening point and the second softening point is less than 5° C.

10. The method of claim 1, wherein thermoforming is performed at a thermoforming temperature and the stretch characteristics of the label and the sheet at the thermoforming temperature are compatible with one another such that during thermoforming, neither the label nor the sheet tears or fractures.

11. A method of forming a labeled article, the method comprising:
providing a polymeric sheet, the sheet including a first material;
providing a polymeric label, the label including a second material;
printing a visual design on the label;
attaching the label alongside the sheet by an effective amount of adhesive disposed between the label and the sheet;
immediately thermoforming the sheet after the label is attached thereon to thereby form the labeled article;
wherein the first material and the second material exhibit compatible stretch characteristics at a temperature at which thermoforming occurs wherein the label is applied in-situ; and
wherein the sheet is permanently deformed to a desired article shape during the thermoforming.

12. The method of claim 11, wherein the difference in softening points of the first material and the second material is less than 10° C.

13. The method of claim 12, wherein the difference in softening points of the first material and the second material is less than 5° C.

14. The method of claim 11, wherein printing is performed by digital printing.

15. The method of claim 11, wherein printing is performed by a technique selected from the group consisting of offset printing, flexographic printing, and gravure printing.

16. The method of claim 11, wherein the visual design printed on the label is distorted prior to thermoforming.

17. The method of claim 11, wherein the visual design printed on the label is free of distortion after thermoforming.

18. A method for producing a labeled article comprising:
forming a visual design on a label;
immediately after the forming, attaching the label along a face of a thermoformable sheet via an adhesive;
immediately after the attaching, thermoforming the sheet;
wherein the sheet permanently deforms to a desired article shape during the thermoforming; and
wherein the label stretches with the sheet during the thermoforming and is secured to the article in situ during the thermoforming to produce the labeled article.

19. The method of claim 18, wherein the sheet comprises polyethylene terephthalate; and wherein the label comprises glycol-modified polyethylene terephthalate (PETG).

20. The method of claim 1, wherein the adhesive is selected from the group consisting of UV hot melt acrylic based adhesives and emulsion acrylic based adhesives.

* * * * *